(12) United States Patent
Lefebvre et al.

(10) Patent No.: US 9,170,021 B2
(45) Date of Patent: Oct. 27, 2015

(54) VALVE ASSEMBLY FOR A LIGHTER AND GAS LIGHTER COMPRISING SUCH VALVE ASSEMBLY

(75) Inventors: Guy Lefebvre, Redon (FR); Yann Lefebvre, Pornichet (FR)

(73) Assignee: SOCIETE BIC, Clichy (FR)

( * ) Notice: Subject to any disclaimer, the term of this patent is extended or adjusted under 35 U.S.C. 154(b) by 362 days.

(21) Appl. No.: 13/992,798

(22) PCT Filed: Dec. 9, 2010

(86) PCT No.: PCT/IB2010/003413
§ 371 (c)(1),
(2), (4) Date: Jun. 10, 2013

(87) PCT Pub. No.: WO2012/076925
PCT Pub. Date: Jun. 14, 2012

(65) Prior Publication Data
US 2013/0273484 A1 Oct. 17, 2013

(51) Int. Cl.
*F23Q 2/173* (2006.01)
*F16K 1/32* (2006.01)
*F16K 31/60* (2006.01)

(52) U.S. Cl.
CPC . *F23Q 2/173* (2013.01); *F16K 1/32* (2013.01); *F16K 31/602* (2013.01)

(58) Field of Classification Search
CPC .......... F23Q 2/173; F23Q 2/16; F23Q 2/163; F16K 31/602; F16K 1/32; F16K 1/34; F16K 1/36; F16K 1/38; F16K 1/42; F16K 1/44; F16K 1/46; F16K 31/605
See application file for complete search history.

(56) References Cited

U.S. PATENT DOCUMENTS

| RE26,012 | E   | 5/1966  | Green              |
|----------|-----|---------|--------------------|
| 3,590,591| A * | 7/1971  | Genoud ........ 62/48.4 |
| 4,478,570| A   | 10/1984 | Johansson          |
| 5,192,205| A   | 3/1993  | Iwahori            |
| 2004/0072114 | A1 | 4/2004 | Doucet et al.    |

FOREIGN PATENT DOCUMENTS

CA           893226          2/1972

OTHER PUBLICATIONS

International Search Report for PCT/IB2010/003413.

* cited by examiner

*Primary Examiner* — Alfred Basichas
(74) *Attorney, Agent, or Firm* — Jones Day

(57) ABSTRACT

The valve assembly includes a tubular rigid body that can be arranged in the upper wall of a lighter gas reservoir and a hollow rod extending along a central axis from a lower end located within the tubular body to an upper end located outside the tubular body. A retaining member (R), on which the upper end of the tubular body is crimped, surrounds a cylindrical portion of the hollow rod. Movement of the hollow rod through the retaining member from a closed position to an opened position enables gas to flow from a lower hole of the valve assembly to the upper end of the hollow rod. The retaining member (R) made of synthetic resin has an annular shape with a slit that can be circumferentially expanded. This member has a reduced thickness at a contact area with crimped portion of the tubular body.

15 Claims, 2 Drawing Sheets

VALVE ASSEMBLY FOR A LIGHTER AND GAS LIGHTER COMPRISING SUCH VALVE ASSEMBLY

CROSS REFERENCE TO RELATED APPLICATION

This application is a national stage application of International Application No. PCT/IB2010/003413 filed on Dec. 9, 2010, the entire contents of this application are incorporated herein by reference.

FIELD OF THE INVENTION

The embodiment of the present invention relate to a gas lighter and a method for assembling components of a gas lighter.

BACKGROUND OF THE INVENTION

More particularly, the embodiment of the present invention relate to a valve assembly forming all or part of a gas dispensing device in a gas lighter suitable notably for lighting a cigarette. Such a gas lighter comprises a reservoir having an upper wall through which there passes a well and intended to contain a fuel, the valve assembly being arranged in the well. The valve assembly comprises a hollow rod that may form a spray nozzle and a tubular rigid body housing the lower end of the hollow rod. The tubular body may be typically a metallic body but rigid plastic may be used as well, as disclosed in patent application CA 893226. The hollow rod can be engaged by an actuator, for instance a lever, and is movable between a closed position and an opened position enabling gas to flow through the well from inside of the reservoir to the ignition area.

To prevent gas leak through the well, outer sealing is required between the tubular rigid body and the well, while inner sealing is required between the tubular rigid body and the hollow rod. It is a known practice to provide a cylindrical washer for retaining the hollow rod as depicted in FIG. 1 of document U.S. Pat. No. 4,478,570. Such a washer, which is preferably less rigid than the hollow rod, is adapted to prevent leaks of gas from the space surrounding the lower end of the hollow rod. Indeed, the sliding area between the hollow rod and the tubular rigid body cannot be considered as gas tight.

However, sliding movement of the hollow rod through the washer may cause loss of tightness and a secondary flow of gas when the valve is opened. It is also known valve units that comprise several sealing joints for improving the seal function, resulting in numerous individual parts in the valve assembly. These valve units for gas lighters are relatively expensive to produce, because of the time necessary for assembly of these parts, which are of very small dimensions. This high cost of the valve units is particularly unwelcome in the case of cheap lighters, such as those which are thrown away after the fuel stored therein has become exhausted.

Therefore, a need exists for a gas lighter valve assembly of simplified construction, preferably reduced bulk, while at the same time affording a good seal and safety of use.

SUMMARY OF THE PRESENT INVENTION

The embodiments of the present invention provide a valve assembly for a gas lighter that includes:

a tubular rigid body having a lower end provided with a hole designed to be in communication with a gas reservoir and an upper end provided with an upper opening;

a hollow rod extending along a central axis through the upper opening from a lower end located within the tubular body to an upper end located outside the tubular body, the hollow rod having a lower enlarged portion located within the tubular body and an upper enlarged portion located outside which is designed for cooperating with a command lever; and a retaining member which surrounds a cylindrical portion of the hollow rod and on which the upper end of the tubular body is crimped, the hollow rod being movable through the retaining member between a closed position and an opened position enabling a gas to flow from the hole of the lower end to the upper end of the hollow rod, wherein the retaining member has an annular shape with a slit extending from an inner side of the retaining member to an outer side of the retaining member, and wherein the retaining member is made of synthetic resin for enabling a circumferential expansion of the slit. The slit preferably extends radially from the central axis.

By virtue of this arrangement, the cylindrical portion of the hollow rod is surrounded by a circumferentially expandable joint that may be efficiently fitted onto the hollow rod (i.e. pass over the collar or similar enlarged portion of the rod, by deformation) and defines an efficient sealing area around the rod.

According to another feature, the retaining member has circumferential ends delimiting the slit, the circumferential ends abutting to each other when the upper end of the tubular body is crimped onto said retaining member. Accordingly, the retaining member may be used as a single joint between the upper end of the tubular body and the hollow rod and provides efficient sealing.

According to another feature, the retaining member is made of polyacetal and preferably of Delrin®. With such a material, excellent dimensional stability and low friction are advantageously obtained. Low friction prevents that some defects of the rod jam with the retaining member. The retaining member is thus well adapted to be fitted onto the hollow rod (with a radially outwards expansion) and then compression onto the hollow rod under action of the crimped portion of the tubular body (i.e. with a radially inwards compression).

According to a particular feature, the upper end of the tubular body includes an annular crimped portion in circumferentially continuous contact with a contact portion of the retaining member, the retaining member having an upper portion that extends axially from the contact portion to an upper end located outside the tubular body. With such an arrangement, guidance of the hollow rod inside the retaining member R is increased. Moreover, the upper end of the retaining element may eventually be engaged by the command lever instead of an enlarged portion of the rod. Accordingly, less material is used for making the rod.

According to another feature, the retaining member has a cylindrical shape with a radial flange having an outer diameter corresponding to the inner diameter of a tubular body portion adjacent to the crimped portion. The tubular body may comprise a stepped portion on which the lower face of the flange of the retaining member abuts. With this arrangement, the retaining member is securely attached to the tubular body and movement of the rod cannot cause any axial displacement of the retaining member.

The use of a retaining member with a flange and thinner portions is advantageous to obtain satisfactory valve assemblies of reduced size, with mass production and with production equipment operating at a high rate.

According to another feature, the crimped portion and the hollow rod are separated by a radial gap comprised between 0.005 mm and 0.04 mm, and preferably about 0.02 mm. The functional play between the rod and the retaining member is thus reduced. This enables to significantly decrease the secondary flow of gas passing between the lower enlarged portion of the rod and the inner face of the tubular body. Use of a retaining member in a synthetic resin material lowering friction with the rod (usually made of metallic material, Zamac for instance) is suitable to obtain a gap inferior or equal to 0.02 mm without impairing dimensional stability of the retaining member.

As the contact portion of the retaining member is thin, quantity of material for producing the retaining member is reduced. The diameter of the tubular body may be also reduced with this arrangement, thus saving material to produce the tubular body (typically a metallic tubular body).

According to a particular feature, the retaining member comprises an upper portion having a constant thickness near the radial flange, which is higher than maximal thickness of a retaining member lower portion adjacent the radial flange.

According to a particular feature, the tubular body is a single metallic piece. The tubular body is thus adapted to be force-fitted or fixed similarly into the well provided in the upper wall of a gas reservoir.

According to another feature, the tubular body comprises a cylindrical portion of constant thickness, length of this cylindrical portion being not inferior to 60% of length of the tubular body. Accordingly, shape of this piece is quite simple and the tubular body is easier to manufacture.

According to a particular feature, the tubular body defines an interior volume, the valve assembly comprising a gas flow regulating device located in this interior volume and forming a single unitary assembly. The gas flow regulating device may be retained within the tubular body by crimping the lower end of the tubular body. This arrangement facilitates assembling the rod and the gas flow regulating device. These main parts of the valve assembly are assembled only with crimping operations on the two opposite ends tubular body. The components are advantageously arranged (totally or partially) in the interior volume defined by the tubular body. In other words, only one piece (the tubular body) is used for positioning the retaining member and the gas flow regulating device, a unitary valve assembly being obtained.

One object of the present invention is also to provide an improved gas lighter.

Accordingly, it is further proposed according to the invention a gas lighter that includes the valve assembly mounted into a well arranged within the upper wall of the gas reservoir. Mounting of the valve assembly may be performed by press fitting the tubular body into the well.

Other features and advantages of the invention will become apparent to those skilled in the art during the description which will follow, given by way of a non-limiting example, with reference to the appended drawings.

DETAILED DESCRIPTION OF THE INVENTION

In the various figures, the same references are used to designate identical or similar elements.

Figure 1:
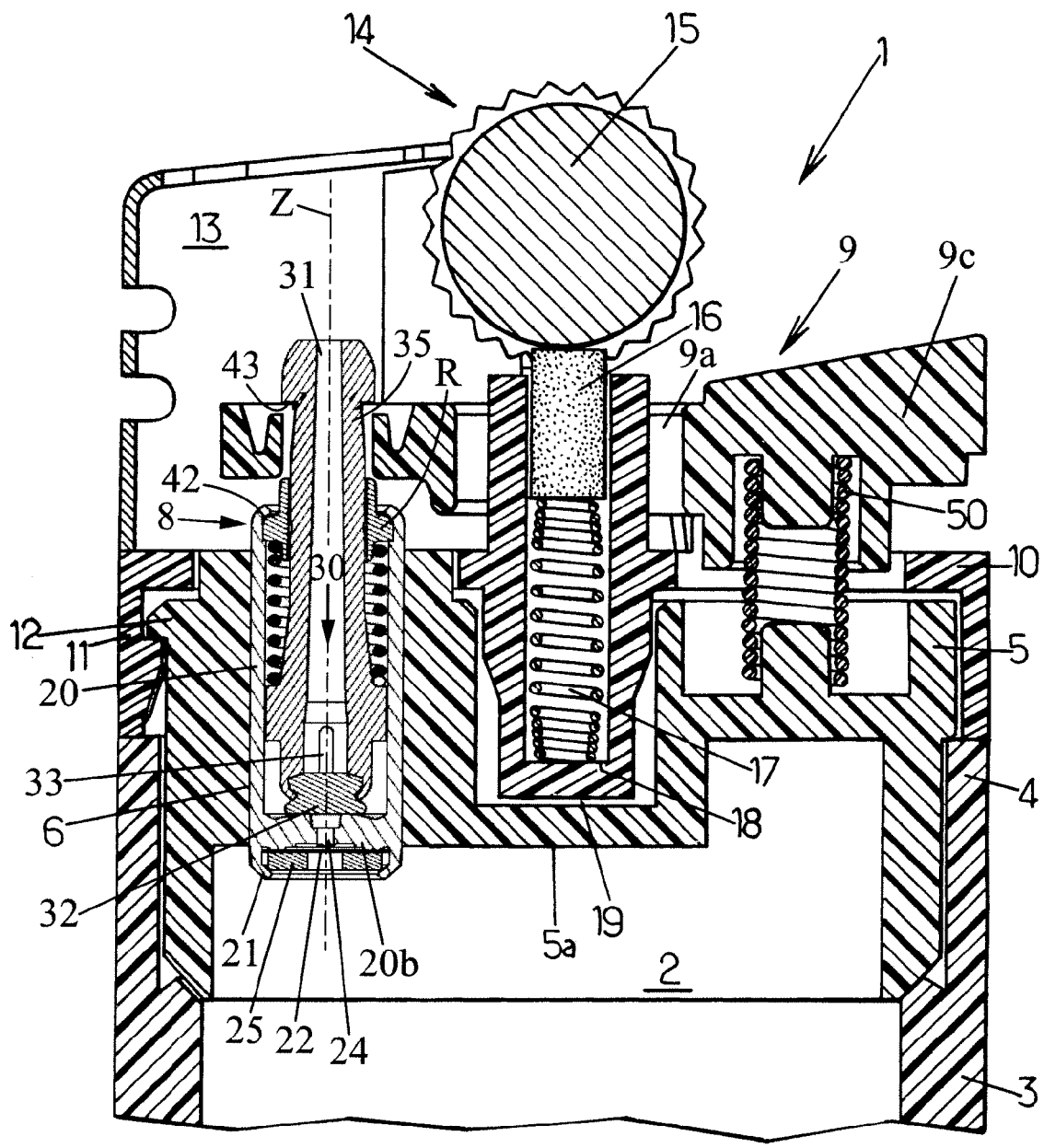
FIG. 1 is a vertical cross-sectional view of a top portion of a gas lighter, showing a valve assembly in a mounted state according to a first embodiment.

For purposes of promoting an understanding of the present invention, reference will now be made to one exemplary, non-limiting embodiment illustrated in FIGS. 1 to 3. As shown in FIG. 1, the gas lighter 1 comprises a reservoir 2 intended to contain a fuel under pressure and, partially, in liquid phase, such as isobutane.

As shown in FIG. 1, the reservoir 2 may be formed of a bowl 3, the bowl 3 preferably being U-shaped in cross-section, and having a bottom wall, not visible in FIG. 1, and an annular side wall that extends upwards from the bottom wall to an upper end 4.

The upper end 4 may be closed off by an upper wall 5 which, in the example depicted, may be a separate part fixed to the bowl 3 by any method known in the art including, but not limited to, bonding, gluing, welding, friction, press fit, etc. Alternatively, the upper wall 5 may be manufactured as an integral part with the bowl 3.

The reservoir 2 is preferably manufactured from at least one rigid polymer material, for instance amorphous polymer material or crystallized polymer material, and can thus be injection molded.

The upper wall 5 of the reservoir may further have a well 6, that in the example shown extends along a vertical axis Z and which advantageously may be in the shape of a cylinder that is circularly symmetrical.

The well 6, generally speaking, is capable of receiving a valve assembly 8 that is actuated by a command lever 9 or similar mobile operating device carried by the head 10 of the lighter, which overlies the reservoir 2. In the embodiment depicted, the head 10 preferably is retained against the upper wall 5 of the reservoir by catches 11 (i.e., studs) on the head 10 that cooperate by snap-fitting or clipping with complementary catches 12 molded in the upper wall 5 of the reservoir 2.

The head 10 may also form a support for fitting an ignition device 14 and a windshield 13, the windshield 13 forming a screen or shield against the wind or draft.

The ignition device 14, which is generally widely known in the art, may comprise, for example, a spark wheel 15 and a flint 16 held pressed against the spark wheel 15 by a spring 17 received in a circular cavity 18 in the head 10. A complementary cavity 19 is formed in the upper wall 5 of the reservoir 2 to accommodate the cavity 18 of the head 10. However, it is of course possible to use other types of ignition devices, such as a piezoelectric device, etc.

Figure 2:
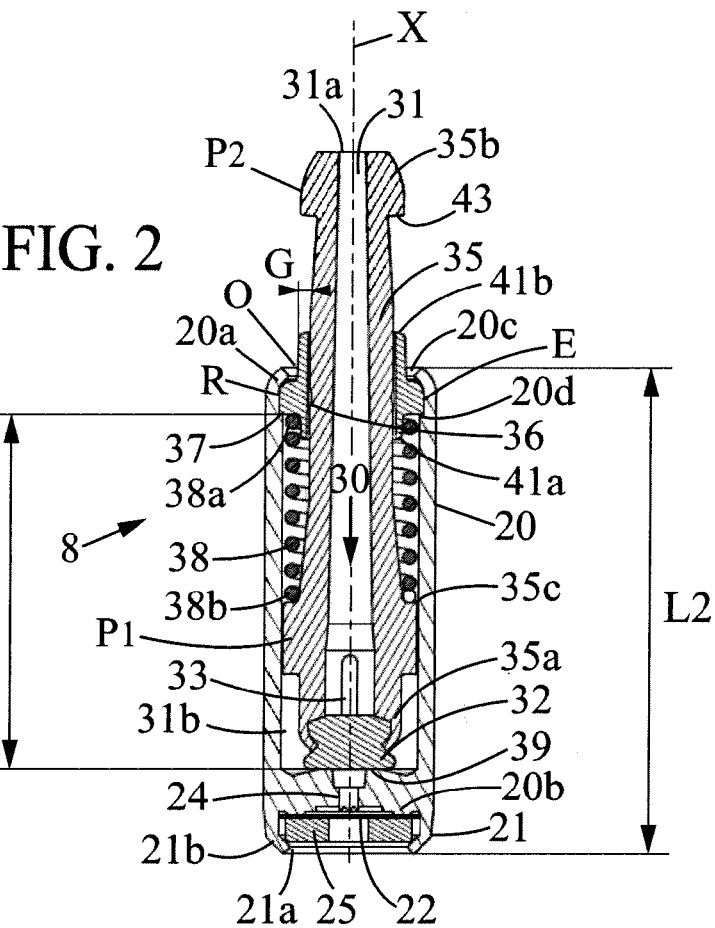
FIG. 2 is a vertical cross-sectional view of the valve assembly of FIG. 1.

As further shown in FIG. 2, the valve assembly 8 comprises a tubular body 20, which is rigid and made here of metallic material (of metal or suitable alloy for instance). The tubular body 20 defines an outer tube of the dispensing device and may be directly force-fitted in the well 6. An additional tubular element may be optionally used for be insertion of the valve assembly 8 in the well 6, as disclosed in patent application WO 2009/112892 for instance.

The lower end 21 of the tubular body 20 is preferably provided with a regulating device for regulating the gas flow rate, which regulating device may be, for example, a microporous membrane 22. This microporous membrane 22 preferably includes a film of polypropylene stretched uniaxially and having pores of elongate shape, as described in U.S. Pat. No. 4,496,309. The microporous membrane 22 preferably is held against an interior shoulder 20b of the tubular body 20, the shoulder 20b being formed in the vicinity of the lower end 21 of the tubular body 20, thus enabling the microporous membrane 22 to cover an orifice 24 formed in the center of the shoulder 20b. The microporous membrane 22 is preferably pressed against the bottom face of the shoulder 20b by a rigid ring 25, which is itself retained at the bottom of the tubular body 20 by crimping the lower end 21 of the tubular body 20.

As shown in FIGS. 1 and 2, the valve assembly 8 here comprises the gas flow regulating device and forms a single unitary gas dispensing assembly. The valve assembly 8 preferably includes a valve member 30 having a gas outlet duct 31 opening near the ignition device 14. The duct 31 preferably includes a shutter 32 located in the lower part of the valve assembly 8. Preferably, the shutter 32 is made from an elastomeric material designed to shut off the gas passage orifice 24 as the duct 31 is moved along the longitudinal axis Z of the inner wall of the well 6. Preferably, the duct 31 also contains one or more slots 33 formed near the shutter 32 in order to provide communication with the inside of the tubular body 20.

The gas outlet duct 31 is here defined by a rigid hollow rod 35, made of an alloy or suitable metallic material resistant to gas such as isobutane. Alloys having a base metal of zinc and alloying elements of aluminum, magnesium and copper may advantageously used (for instance Zamak) as base material of the hollow rod 35.

As shown in FIG. 2, the hollow rod 35 extends along a central axis from a lower end 35a to an upper end 35b. The lower end 35a may be directly fixed to the shutter 32 and the slots 33 are provided at a distance from the contact area between the shutter 32 and the hollow rod 35. The hollow rod 35 is fitted within the tubular body 20 so as to be axially displaceable. In this non-limiting embodiment, the shutter 32 and the hollow rod 35 thus define the mobile valve member 30 of the valve assembly 8. The shutter 32 here defines, at least in its upper end, a sealing disk in contact with the hollow rod 35. The upper end 35b of the hollow rod 35 is enlarged or may be formed with a collar enabling it to be engaged by the command lever 9 so that, upon displacement of this command lever 9, the valve member 30 can be raised to release gas through the mouth 31a of the duct 31.

As shown in FIG. 2, the duct 31 comprises an axial bore and one or more radial bores defined by the slots 33. With this arrangement, the mouth 31a at the upper end 35b of the hollow rod 35 communicates with a space 31b surrounding the lower end of the valve member 30. The lower end 21 of the tubular body 20 is provided with a hole 21a designed to be in communication with the reservoir 2 and an upper end 20a provided with an upper opening O, through which the hollow rod 35 passes. Gas from the reservoir can be dispensed when the valve member 30 is raised, by circulating inside the tubular body 20 from the lower end 21 to the upper end 20a. Gas here circulates through the microporous membrane 22, the orifice 24, the space 31b, the radial bores and then the axial bore of the duct 31.

Still referring to FIG. 2, the upper end 20a is provided with a crimped portion 20c for maintaining a retaining member R at the top of the tubular body 20. The retaining element R is in a fixed position relative to the tubular body 20 and surrounds a cylindrical portion 36 of the hollow rod 35. The retaining member R extends axially around the central axis X of the hollow rod 35 and has an annular shape. In FIG. 1, the central axis X of the hollow rod 35 corresponds exactly to the central axis Z of the well 6 but could also be arranged substantially parallel to the central axis Z. The retaining member R provides a gas tight seal between the outer cylindrical portion 36 of the hollow rod 35 and the inner face of the tubular body 20. The retaining element R is cut longitudinally on one side to define a slit 40 (FIG. 3), which extends radially from the central axis X of the hollow rod 35. The inner face f1 of the retaining element may be of cylindrical shape in the mounted state of valve assembly 8. An annular bead B provided on the outer face f2 of the retaining element R protrudes radially outwards to define a radial flange. The annular bead B of the retaining member R defines a lower face 37, which is here adjacent a lower end 41 of the retaining element R. The lower face 37 may be a planar face. The annular bead B protrudes in an annular recess E of the tubular body 20, the inner diameter of the annular recess E being larger than inner diameter in the area of contact with the hollow rod 35. The recess E is delimited by a stepped portion 20d of the tubular body 20, on which the lower face 37 abuts.

The annular bead B also forms a shoulder 42 in contact with the crimped portion 20c of the tubular body 20. The contact portion C engaged by the crimped portion 20c is adjacent the annular bead B. The annular bead B is at a shorter distance from the retaining member lower end 41a than from the retaining member upper end 41b. The retaining member R has an upper portion T1 that extends axially from the contact portion C to the upper end 41b located outside the interior volume defined by the tubular body 20. This upper portion T1 increases guidance of the hollow rod 35 inside the retaining member R.

Figure 3:
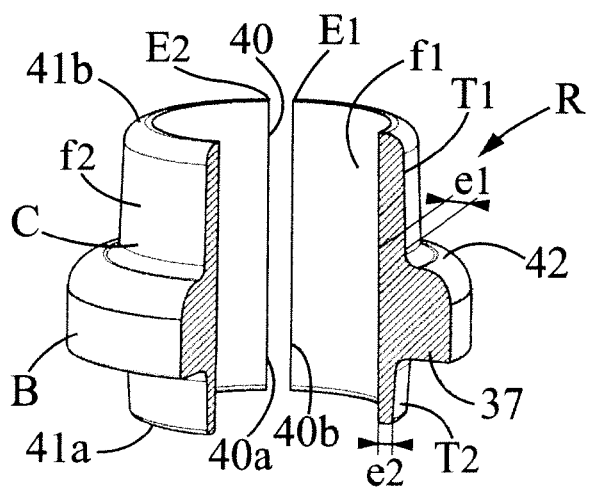
FIG. 3 is a perspective view of a retaining member used in the valve assembly of FIG. 2, in a non-mounted state.

As shown in FIG. 3, the contact portion C above the annular bead B has a constant thickness e1, which is higher than maximal thickness e2 of the retaining member lower portion T2. The upper portion T1 of the retaining element R is preferably less thin than the lower portion T2 extending to the lower end 41a. The lower portion T2 may be tapered toward the lower end 41a. The upper portion T1 defines at the upper end 41b an annular front face adapted to be engaged by the command lever 9.

The lower face 37 defined by the annular bead B is in contact with an upper end 38a of a biasing element 38 provided in the valve assembly 8. At its lower end 38b, the biasing element 38 is in contact with an outer shoulder 35c of the hollow rod 35. The biasing element 38 is preferably a coiled spring. In the non-limiting example shown in FIGS. 1-2, the lower portion T2 of the retaining member R is used for centering this spring and prevents friction between the spring and the hollow rod 35. Alternatively, one or more resilient blades or other similar biasing element could be used.

The biasing element 38 is arranged to be held by the retaining member R and is in a compressed state so as to exert a biasing force against the valve member 30, whereby the shutter 32 is normally held in a closed position. In this position, the shutter 32 is held against a seat 39 formed as a boss on the interior shoulder 20b or analogous support member.

Thus, when the shutter 32 is retracted from the seat 39, i.e. the valve member 30 is displaced upwardly, gas flows through the seat 39 into the space 31b and thence via slots 33 and axial bore of the duct 31 through the hollow rod mouth 31a where the gas can be ignited via a piezoelectric or mechanical striker generating a spark in the usual manner.

In opened position, upper movement of the hollow rod 35 causes the biasing element 38 retained by the retaining member R to be energized. Accordingly, when the valve member 30 is displaced downwardly (i.e. when the upper end 35b of the hollow rod 35 is disengaged), the shutter 32 is pushed by the biasing element 38 against the seat 39 to close communication between the reservoir 2 and the space 31b.

Now referring to FIG. 1, the command lever 9 may include a fork 9a mounted to tilt about a pin secured to the head 10. The fork 9a has a first end 9b and a second end 9c. The first end 9b may cooperate with a lower shoulder formed by the upper front face of the retaining member R and an upper shoulder 43 formed on the upper end 35 of the hollow rod 35 which emerges from the tubular body 20 thus permitting the valve assembly 8 to be raised as the user depresses the second end 9c of the fork 9.

Preferably, a compression spring 50 is arranged between the underside of the second end 9c of the fork 9a and the upper wall 5 of the reservoir 2 thus biasing the second end 9c of the fork 9 upwards and hence biasing the valve member 30 into a closed position when the lighter is not in use.

Referring to FIG. 3, the retaining element R may be a single piece of plastic material, for instance synthetic resin having a low coefficient of friction. In this non-limiting embodiment, respective circumferential ends of the retaining member R delimit the slit 40. When the retaining member R is not mounted in the valve assembly 8, the slit 40 separates the two longitudinal rims 40a, 40b of the retaining member R respectively defined by the two circumferential ends. The slit 40 may being obtained in a known manner, for instance by cutting a circumferentially continuous piece of synthetic resin. Alternatively according to a less preferred embodiment, the retaining member R could be injection molded, the initial distance between the two longitudinal rims 40a, 40b (in the non-mounted state) being for instance inferior to 1-5% of the perimeter of the inner face f1 in the mounted state.

The slit 40 extends from the inner side (face f1) of the retaining member R of annular shape to the outer side (face f2) of the retaining member R and may be of any suitable form (preferably of the butt cut type). For instance the slit 40 may extend radially from the central axis X as shown in FIG. 3 but could also be obtained using a step cut. Accordingly, although the rims 40a, 40b shown in FIG. 3 are straight rims, other suitable shapes may be provided. The retaining member R may be easily fitted onto the cylindrical portion 36 of the hollow rod 35. Indeed, as the hollow rod 35 has a lower enlarged portion P1 and an upper enlarged portion P2, fitting is more complicated using a circumferentially continuous annular body.

Although FIGS. 1-2 show a single-piece hollow rod 35, the upper enlarged portion P2 may also be obtained using an additional element which is secured to a main piece forming all or part of the duct 31, whereby location and external shape of the upper enlarged portion P2 are similar or same as in embodiment shown in FIGS. 1-2. For instance, such an additional element of tubular shape is affixed, welded or crimped (after crimping the upper end 20a of the tubular body 20) directly on an outer cylindrical face of the hollow rod main piece. The main piece and the additional piece are preferably made of the same material.

Referring to FIG. 2, the retaining element R is adapted to be compressed in a known manner when arranged between the tubular body 20 and the hollow rod 35. In the mounted state (after crimping of the upper end 20a), the slit 40 is contracted, i.e. the retaining member R is arranged around the cylindrical portion 36 in a circumferentially contracted position wherein an inner perimeter of the retaining member R is displaced towards the central axis X of the hollow rod 35. The radial gap G between the hollow rod 35 and the tubular body 20 may be reduced using a thin contact C of the retaining member R. A high reduction of thickness without causing problem in the fitting step around the hollow rod 35 is obtained thanks to circumferential expansion of the slit 40. As a result, the radial gap G may be comprised between 0.005 mm and 0.04 mm, and is preferably about 0.02 mm. The radial gap G is here defined between the outer cylindrical portion 36 of the hollow rod 35 and the crimped portion 20c at the upper end 20a of the tubular body 20. Although a thickness of the contact portion C of about 0.02 mm is preferred, lower or greater thickness may be used, depending on the specific intended use. In this example as shown in FIGS. 1-3, the valve assembly 8 has an elongated shape and diameter of the valve assembly is close to the greater diameter of the hollow rod 35. For instance, the valve assembly 8 may be obtained with a length typically comprised between 4 and 10 mm, the outer diameter being comprised between 1 and 2.5 mm.

The longitudinal rims 40a, 40b form a butt joint in the mounted state of the retaining member R in the valve assembly 8. As the gap G is reduced, the arrangement of the valve assembly 8 provides a gas tight seal more efficient than with conventional valve units.

The synthetic resin of the retaining member R has preferably a low friction coefficient with metallic material such as Zamac. This parameter is advantageous to highly reduce thickness of the retaining element R, at least in the contact portion C. The synthetic resin may be chosen in the group of semi-crystalline thermoplastics. Particularly suitable examples of these thermoplastics are:

polyacetal such as polyoxymethylene (Delrin® or similar),
polyamide such as Nylon® OR Nylatron®,
UHMW polyethylene.

Polyacetal may be considered as a preferred material, in particular because the thermal expansion coefficient is low, for instance about 80 $10^{-6}$ mm/° C. when using Dekin® (excellent dimensional stability of this POM homopolymer).

Although the retaining member R shown in FIGS. 1-3 is a single piece in contact with the biasing element 38, the crimped portion 20c and the intermediate cylindrical portion 36 of the hollow rod 35, it should be understood that such a single piece may be replaced by two or more annular sealing elements made of synthetic resin, at least one of these elements being provided with a radial slit (this element with the slit being preferably in contact with the crimped portion 20c).

The present invention has been described in connection with the preferred embodiments. These embodiments, however, are merely for example and the invention is not restricted thereto. It will be understood by those skilled in the art that other variations and modifications can easily be made within the scope of the invention as defined by the appended claims, thus it is only intended that the present invention be limited by the following claims. For instance, the microporous membrane 22 may be located outside the interior volume defined by the tubular body 20 and/or the retaining member R may be inserted from the hole 21a of the tubular body 20 and/or the holes 21a may be offset laterally relatively to the central axis X of the hollow rod 35.

It should also be understood that the invention may be implemented in any gas apparatuses provided with a dispensing device and a gas reservoir 2.

The invention claimed is:

1. A valve assembly for a gas lighter, comprising:
   a tubular rigid body having a lower end provided with a hole designed to be in communication with a gas reservoir and an upper end provided with an upper opening;
   a hollow rod extending along a central axis through the upper opening from a lower end located within the tubular body to an upper end located outside the tubular body, the hollow rod having a lower enlarged portion located within the tubular body and an upper enlarged portion located outside which is designed for cooperating with a command lever; and
   a retaining member which surrounds a cylindrical portion of the hollow rod and on which the upper end of the tubular body is crimped, the hollow rod being movable through the retaining member between a closed position and an opened position enabling a gas to flow from the hole of the lower end to the upper end of the hollow rod, wherein the retaining member has an annular shape with a slit extending from an inner side of the retaining member to an outer side of the retaining member and wherein the retaining member is made of synthetic resin for enabling a circumferential expansion of the slit.

2. The valve assembly according to claim 1, wherein the retaining member has circumferential ends delimiting the slit, the circumferential ends abutting each other when the upper end of the tubular body is crimped onto the retaining member.

3. The valve assembly according to claim 1, wherein the retaining member is made of polyacetal.

4. The valve assembly according to claim 1, wherein the upper end of the tubular body comprises an annular crimped portion in circumferentially continuous contact with a contact portion of the retaining member, the retaining member having an upper portion that extends axially from the contact portion to an upper end located outside the tubular body.

5. The valve assembly according to claim 4, wherein the retaining member has a cylindrical shape with a radial flange having an outer diameter corresponding to the inner diameter of a tubular body portion adjacent to the crimped portion.

6. The valve assembly according to claim 5, wherein the tubular body comprises a stepped portion on which the lower face of the flange of the retaining member abuts.

7. The valve assembly according to claim 4, wherein the crimped portion and the hollow rod are separated by a radial gap comprised between 0.005 mm and 0.04 mm, and preferably about 0.02 mm.

8. The valve assembly according to claim 4, wherein the retaining member (R) comprises an upper portion having a constant thickness near the radial flange, which is higher than maximal thickness of a retaining member lower portion adjacent the radial flange.

9. The valve assembly according to claim 1, wherein the slit extends radially from the central axis.

10. The valve assembly according to claim 1, wherein the tubular body is a single metallic piece.

11. The valve assembly according to claim 1 wherein the tubular body comprises a cylindrical portion of constant thickness, length of the cylindrical portion being not inferior to 60% of length of the tubular body.

12. The valve assembly according to claim 1, wherein the tubular body defines an interior volume, the valve assembly comprising a gas flow regulating device located in the interior volume and forming a single unitary assembly.

13. The valve assembly according to claim 1, comprising a gas flow regulating device which is retained within the tubular body by crimping the lower end of the tubular body.

14. A gas lighter comprising a valve assembly according to claim 13 and a gas reservoir provided with an upper wall, the tubular body defining an outer peripheral face of the valve assembly, wherein the valve assembly is mounted into a well arranged within the upper wall.

15. The gas lighter of claim 14, wherein the valve assembly is mounted into the well by press fitting the tubular body.

* * * * *